(12) United States Patent
Furtwangler et al.

(10) Patent No.: US 9,836,441 B2
(45) Date of Patent: Dec. 5, 2017

(54) PLATFORM ABSTRACTION OF GRAPHICS

(71) Applicant: Home Box Office, Inc., New York, NY (US)

(72) Inventors: Nathan J. E. Furtwangler, Kirkland, WA (US); Brendan Joseph Clark, Seattle, WA (US); Brandon C. Furtwangler, Issaquah, WA (US); J. Jordan C. Parker, Seattle, WA (US)

(73) Assignee: HOME BOX OFFICE, INC., New York, NY (US)

( * ) Notice: Subject to any disclaimer, the term of this patent is extended or adjusted under 35 U.S.C. 154(b) by 32 days.

(21) Appl. No.: 14/843,857

(22) Filed: Sep. 2, 2015

(65) Prior Publication Data

US 2016/0070682 A1    Mar. 10, 2016

Related U.S. Application Data

(60) Provisional application No. 62/046,137, filed on Sep. 4, 2014.

(51) Int. Cl.
*G06F 17/22* (2006.01)
*G06F 9/44* (2006.01)

(52) U.S. Cl.
CPC ............ *G06F 17/2247* (2013.01); *G06F 8/34* (2013.01); *G06F 8/38* (2013.01)

(58) Field of Classification Search
CPC ....................................................... G06F 8/38
See application file for complete search history.

(56) References Cited

U.S. PATENT DOCUMENTS

| | | | | |
|---|---|---|---|---|
| 5,761,647 A * | 6/1998 | Boushy | ............ | G06Q 10/06375 463/25 |
| 5,835,773 A * | 11/1998 | Dunn | ...................... | G06F 8/443 717/146 |
| 6,286,134 B1 * | 9/2001 | Click, Jr. | .................. | G06F 8/47 717/138 |
| 6,370,682 B1 * | 4/2002 | Eckardt | ..................... | G06F 8/34 717/106 |

(Continued)

OTHER PUBLICATIONS

International Search Report and Written opinion from International Patent Application Serial No. PCT/US15/48405, dated Dec. 15, 2015, 11 pages.

(Continued)

*Primary Examiner* — Scott Baderman
*Assistant Examiner* — Mario M Velez-Lopez
(74) *Attorney, Agent, or Firm* — Amin, Turocy & Watson, LLP

(57) ABSTRACT

The described technology is directed towards a graphics platform abstraction layer that couples an application program's user interface objects to any of a variety of underlying platforms, including browsers that host the application program or the operating system's UI objects. The graphics platform abstraction layer loads an appropriate implementation for calling objects of the underlying platform, and interfaces the application program to the implementation, whereby the application program may be independent of any underlying platform. The graphics platform abstraction layer also may load code that deals with quirks of a given browser/version and/or other vendor-specific details.

20 Claims, 13 Drawing Sheets

(56) References Cited

U.S. PATENT DOCUMENTS

| | | | | |
|---|---|---|---|---|
| 7,181,493 | B2* | 2/2007 | English | G06Q 50/18 707/999.1 |
| 2003/0070061 | A1* | 4/2003 | Wong | G06F 8/38 712/220 |
| 2009/0276835 | A1* | 11/2009 | Jackson | G06F 21/54 726/4 |
| 2010/0077386 | A1* | 3/2010 | Akkiraju | G06F 8/35 717/136 |
| 2011/0320502 | A1* | 12/2011 | Marin | G06Q 40/08 707/803 |
| 2015/0082279 | A1* | 3/2015 | Jakobs | G06F 11/3672 717/124 |
| 2016/0162547 | A1* | 6/2016 | Morris | G06F 17/30445 707/718 |
| 2016/0266881 | A1* | 9/2016 | Thompson | G06F 8/60 |

OTHER PUBLICATIONS

Chronos Group: "Connecting Software to Silicon: WebGL—OpenGL ES 2.0 for the Web," Dated Sep. 3, 2014, 2 pages.

* cited by examiner

PLATFORM ABSTRACTION OF GRAPHICS

CROSS-REFERENCE TO RELATED APPLICATION

The present application claims priority to U.S. provisional patent application Ser. No. 62/046,137, filed Sep. 4, 2014, the entirety of which is incorporated herein by reference.

BACKGROUND

A user interface (UI) of a computer program, to be considered favorably by end users, needs to be appealing to those users, straightforward to use and consistent in its operation. Designing such a user interface can be a complex and tedious task, as there typically needs to be a large number of UI-related components that have to work together.

The task is complicated by the various client platforms on which an application program can be run. For example, the same general type of application program may be run on a browser platform, on a gaming/entertainment console platform, on a smartphone platform, on a tablet platform and so on. Adapting the typically complex UI to each platform generally causes much difficulty for the UI designer. Indeed, even within a platform such as a browser having mostly standardized APIs, there are various browser vendors and browser versions, each with its own quirks and vendor-specific details that need to be considered to make the UI operate correctly and relatively efficiently for that particular browser.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, the technology described herein is directed towards a graphics platform abstraction layer including an interface set and an implementation. A display node tree has nodes representing user interface (UI) view objects, with the platform abstraction layer configured to interface nodes of the display node tree to objects of an underlying platform via the implementation. This includes providing data and/or operations to the objects of the underlying platform for rendering a representation of the nodes of the display node tree.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
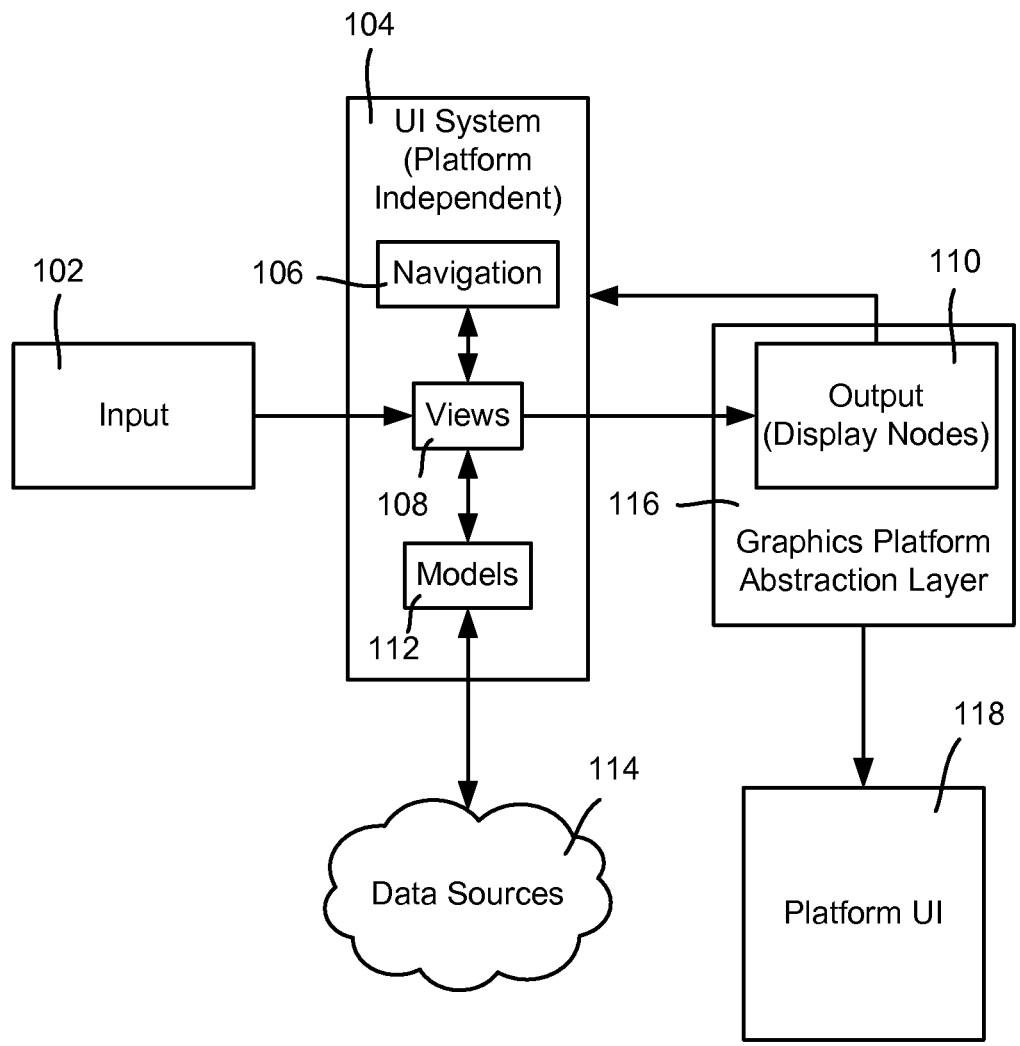
FIG. 1 is an example block diagram representation of a platform-independent user interface (UI) system including view and model objects, in which the platform-independent UI system operates above a platform UI, according to one or more example implementations.

Various aspects of the technology described herein are generally directed towards a graphics platform abstraction layer (PAL) that abstracts the details of an underlying UI platform/framework from the complex operations of a user interface (UI) system. This facilitates having a platform-independent UI that may be run atop any of a variety of underlying platforms.

In general, complex UI operations are performed by view objects and related objects at the platform-independent UI level, including receiving input, retrieving data, visualizing the data according to a designer-specified layout and style, virtualizing child objects, scrolling, navigating among views, and so forth. For example, an element's position, scale, rotation, or any other styleable property is typically handled above the underlying UI platform, meaning that most of the platform-independent UI code/objects can be reused across various platforms.

In general, the view objects at the platform-independent UI level write to nodes of a display tree. The display tree interfaces with (or alternatively can be considered part of) an abstraction layer that processes the display tree nodes into data and instructions as needed by the underlying platform level.

Example underlying platforms include those supporting the iOS® design kit, Android UI, and browsers. The abstraction layer logic adapts for different browser versions and different browser vendors. For example, the abstraction layer may use canvas elements (if HTML5 is supported) for drawing images and possibly text, and HTML elements for text and images (for older browsers that do not support canvas elements). The abstraction layer may leverage WebGL™ (Web Graphics Library) for browsers and devices that support WebGL™. Moreover, the abstraction layer may be designed to get around browser quirks and work with other vendor-specific details.

As will be understood, the graphics PAL describes the interfaces and overall structure of a graphics tree in a way that is independent of the implementation. The various operations (tree parenting, stylistic properties, positioning) are performed against a PAL interface, and it is up to a PAL implementation to translate those operations to specific backing technology.

Leaving the details up to the PAL implementation allows for significant flexibility, and each implementation can account for the quirks or limitations of the target platform. It also means that a display node tree can be the "ground truth" for what an element's position, scale, rotation, or any other style-able property is currently set to. This enables much higher performance, as queries for these values can be answered without conferring with the web browser or native back end.

It should be understood that any of the examples herein are non-limiting. For instance, the abstraction layer as described herein is exemplified with respect to interfacing a platform-independent user interface system to browsers (e.g., via method calls to DOM objects including canvas elements and or WebGL™), and calls to iOS® and Android UI objects/APIs, however these are non-limiting examples. Indeed, as will be understood, the abstraction layer technology described herein may be adapted to work with any suitable platform, including operating system-based platforms (e.g., via XAML and WinJS controls), and future platforms not yet publicly known or implemented. Similarly, although one type of platform-independent UI system is exemplified herein, other types of application programs and/or UI systems may similarly benefit, including those that are not necessarily fully platform-independent but instead are somewhat "tweak-able" to leverage some capabilities of different the underlying platforms.

As such, the technology described herein is not limited to any particular embodiments, aspects, concepts, structures, functionalities or examples described herein. Rather, any of the embodiments, aspects, concepts, structures, functionalities or examples described herein are non-limiting, and the technology may be used various ways that provide benefits and advantages in computing and user interface technology in general.

FIG. 1 is a generalized, conceptual diagram showing various example components that may be used to implement aspects of the technology described herein. In general, input 102 is provided by a user (or possibly automation or the like) to a UI system 104 that is independent of any platform. In one or more example implementations, the platform-independent UI system 104 contains various objects that each have roles and responsibilities and cooperate with each other with respect to providing an interactive, visualized representation of an application program's UI elements. These include a navigation system 106, views 108 (view objects) that each correspond to one or more display nodes which are rendered as output 110, and models 112 (including view model objects and data model objects) that obtain/provide the data needed by the views 108. For example, the models 112 are coupled to data sources 114 such as web services, databases, data stores, the public internet, a private network and/or the like to fetch the data the views need; (models can also cache reusable data for efficiency).

In general and as described herein, the platform-independent UI system 104 performs most of the actual UI work, including handling input, retrieving data, generating output and so forth. The platform-independent UI system 104 arranges the appropriate output (display nodes) 110 with the appropriate data and commands (e.g., script) in generally the same way regardless of the underlying platform (client), whereby the platform-independent UI system 104 need not be changed for each platform and is thus reusable across platforms. Instead of rewriting an application program UI for each platform, a relatively small amount of code provides a graphics platform abstraction layer 116 that interfaces with the underlying platform UI 118; as a result, the underlying platform UI 118 need not do any significant work in typical scenarios. Non-limiting examples of a suitable underlying platform UI 118 include those based upon iOS® design kit, Android™, Windows® (e.g., via XAML and WinJS controls), and browsers via DOM objects including canvas elements and or WebGL™. With respect to browsers, the graphics platform abstraction layer 116 may adjust for different browser vendors and/or versions, e.g., to attempt to optimize around different browser quirks, to operate more efficiently and/or the like.

Thus, a UI designer may put together an application program UI only once, with the UI as complex as desired. Note however that the designer is not limited to the exact same UI design for each platform, because view objects may be styled by the designer to have different properties, (primarily visual properties such as color, size, animation and so on). Thus, for example, with the same set of view objects, a designer may use one set of view style data for a personal computer browser and a different set of view style data for a smartphone platform, so as to provide a more appropriate user experience for each platform. Similarly, the application program running on a tablet device platform may have the same UI view and other objects, yet have the state determine the current style properties, e.g., so as to be styled differently when presenting the UI on the device's relatively small screen versus when the tablet is plugged into and displaying the UI on a relatively large monitor (ten foot design). Note that a view can be styled with transition sets, which determine how the view animates its display nodes as state(s) change, e.g., a view comes into view or exits a view, or receives focus, is hovered over, is selected, and so on.

In general, the views 108 perform a number of operations that make the UI designer's task consistent and straightforward. Non-limiting example view object operations include layout, scrolling, virtualization (e.g., creating only the subset of child views that are currently needed), styling to apply visual and other property values to views, outputting to the display tree (including visible, audio, tactile, etc.), data binding via data models and readiness (e.g., unfolding once data requested asynchronously becomes available). Further a view handles input to a view either within that view's logic or by passing the input up to a parent; any input may be passed by the underlying platform up to an object (e.g., an input provider) at the platform-independent level.

Figure 2:
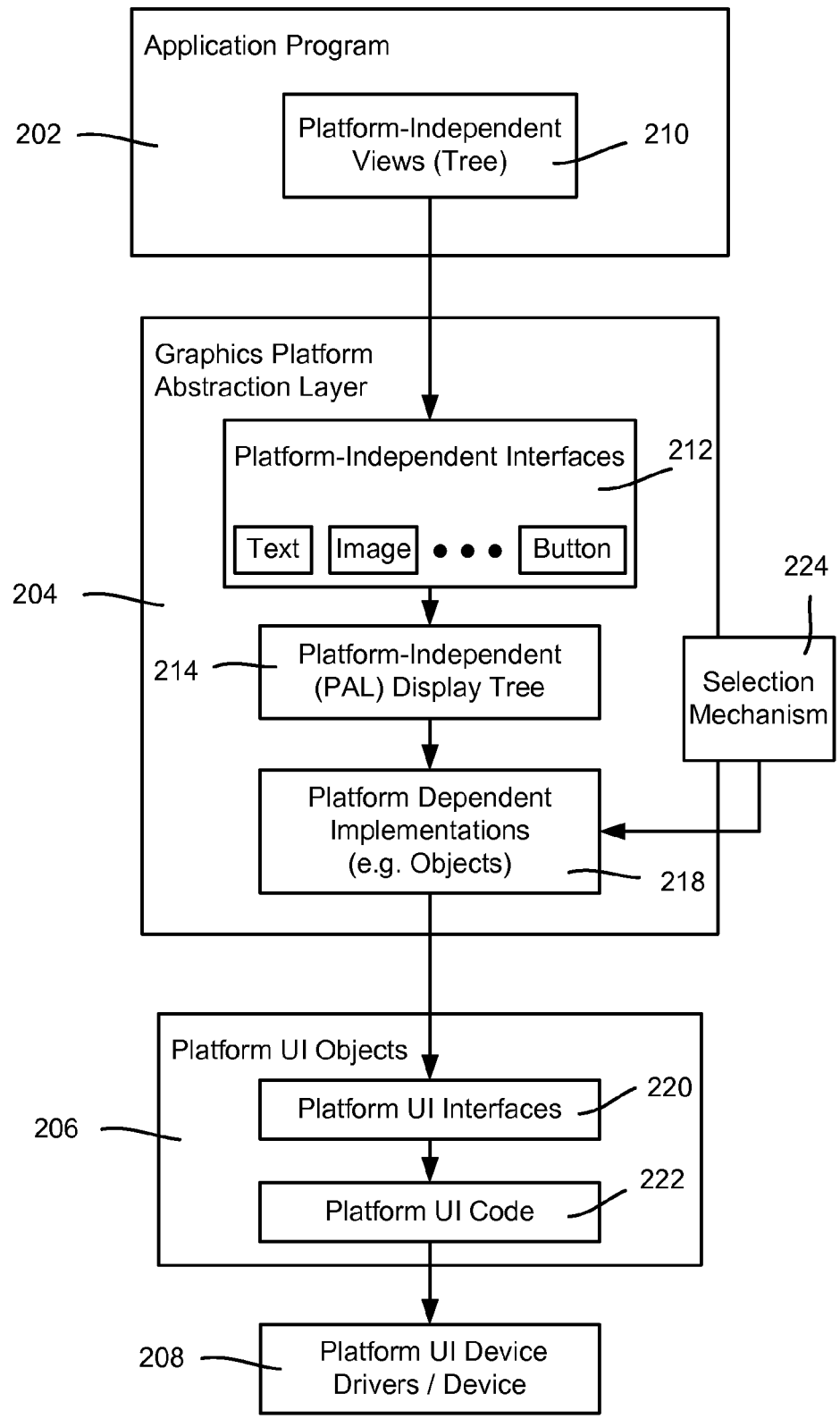
FIG. 2 is an example block diagram representation of a graphics platform abstraction layer that couples an application program UI to platform UI objects via an implementation for that platform UI, according to one or more example implementations.

FIG. 2 is a block diagram representation of how output from an application program 202 is rendered to the user via an abstraction layer 204 to the platform's UI objects 206. From there, suitable drivers for each different vendor's hardware output device(s) render frames on a display, output audio, output vibration and so forth in a known manner; the drivers/devices are shown as block 208.

The application program 202 has its views (view objects) arranged as nodes in a view tree 210. The view tree nodes each map (e.g., via platform-independent interfaces 212) to one or more display nodes in a display node tree 214. The display node tree 214 may be considered part of the abstraction layer 204, e.g., the PAL may include the display tree concept as also generally represented in FIGS. 4-6. Alternatively, the display node tree 214 may be considered part of the application program 202 or some other space(s) in memory to which the application program writes, but in general, comprises data and/or instructions (e.g., script) that are used by the abstraction layer implementation 218.

By way of example, consider that a view wants to draw a rectangle with specified properties, e.g., draw at a certain (e.g., absolute or relative) location the rectangle of a specified size (100×200 pixels) and color (red) with some specified border property values (e.g., a white border of four pixels). When asked to draw, the view may write script (e.g., JavaScript®) and data or the like to a display node that specifies these desired properties.

When the display nodes are processed, the abstraction layer 204 platform-dependent implementations 218 (which may be comprise one or more objects) to make appropriate method calls to the underlying platform's objects (interfaces 220 and UI logic implementations 222). For example, a view corresponding to a button may call a button object interface (or "button" method of a more generic object) to start the process of rendering a button at the platform with associated properties.

Depending on the underlying platform, the abstraction layer 204 via its chosen implementation 218 selects appropriate platform-dependent code (e.g., an object) to convert as needed the button request into a platform object. However, regardless of the underlying platform, in general, because complex UI operations such as layout and styling (as well as animation) are performed above the underlying platform, interfacing the display nodes to the platform object's via the implementation 218 is straightforward.

In some situations, e.g., in which JavaScript® may be used by the platform level's objects, the display node may have JavaScript® instructions and related data that may be interpreted virtually as is to create a corresponding element and draw directly to that element, possibly after applying a transform that adjusts the rectangle size and border size, for example. The use of such a transformation at the platform level allows a user interface to specify data for "one size" without needing to know the actual output device's characteristics (e.g., a small smartphone display screen versus a large television display screen). Note however that the same views may be styled differently at loading time for different platforms, e.g., a container view may have its children styled in a vertical list for a smartphone and a grid pattern for a wide screen device such as a computer monitor. This is generally done at loading time independent of the platform graphics abstraction layer, (although it is feasible to communicate device information back up through the abstraction layer).

In other instances, some processing of the display nodes may be performed to convert the data nodes' data and instructions into suitable platform object interface calls. For example, consider that the underlying platform is a browser of a version that does not support canvas elements. Graphics such as the desired rectangle may be rendered via a call by the implementation for that particular browser version to create and draw to a HTML DOM image object, or to create a DOM rect element with property values set via Cascading Style Sheets (CSS) interfaces, for example.

As another browser example, the abstraction layer implementation may call into the platform UI to add (using JavaScript®) a DOM button object as a child of an appropriate parent DOM element of that button. The style properties may be applied by using script to vary the CSS object model.

Note however that even with browsers that support HTML canvas elements or WebGL™ canvas elements, it may not be efficient to always draw a view's pixels. For example, consider a view that has a large amount of text to display in a browser platform, where based upon the amount of text, it is deemed likely that the user will perform significant scrolling and/or paging. Because HTML handles text very efficiently, it is likely more efficient to use DOM text elements than to draw and redraw the currently appearing text as pixels into a canvas element each time the user scrolls. Thus, for example, the abstraction layer can use thresholds and percentage values (e.g., learned by testing), such as to use HTML text elements for a view comprising text that occupies more than X percent of the total UI viewing space (meaning a lot of text will be visible on screen at any time which would require a lot of pixels to draw to a canvas) when only Y percent of the text fits in that space (meaning a lot of scrolling/paging is likely which would require significant redrawing of the many pixels to the canvas).

Conversely, it may be more efficient to render text as pixels via a canvas element or a two-dimensional (2D) WebGL™ element. For example, consider a tile view comprising an image and a few character text movie rating "(G)" superimposed above the image. Instead of having a DOM image element and a DOM text element, the abstraction layer implementation 218 may write both combined into a set of pixels to a canvas element.

Also shown in FIG. 2 is a selection mechanism 224. This is because at least some of the abstraction layer implementation's objects may need to be selected based upon a condition/information not known until application program loading time, including whether the underlying platform is a browser implementation or a non-browser implementation. Further, while the set of possible abstraction layer implementations may be determined to an extent before loading time (e.g., it is a waste of resources to store the abstraction layer objects that work with iOS® on an Android™ platform, or vice-versa), when running on a browser platform the abstraction layer 204 needs to adapt to different browser vendors and/or versions, which is not known until runtime. For example, a personal computer may have multiple browsers thereon and/or a version not known in advance, e.g., a Google® Chrome™ browser version, a Microsoft® Internet Explorer browser version, Mozilla® Firefox® browser version, and so on, and thus when running on a browser platform, the set of platform-dependent objects selected for use by the abstraction layer depend on which browser and version is used to host/run the application program.

Figure 3:
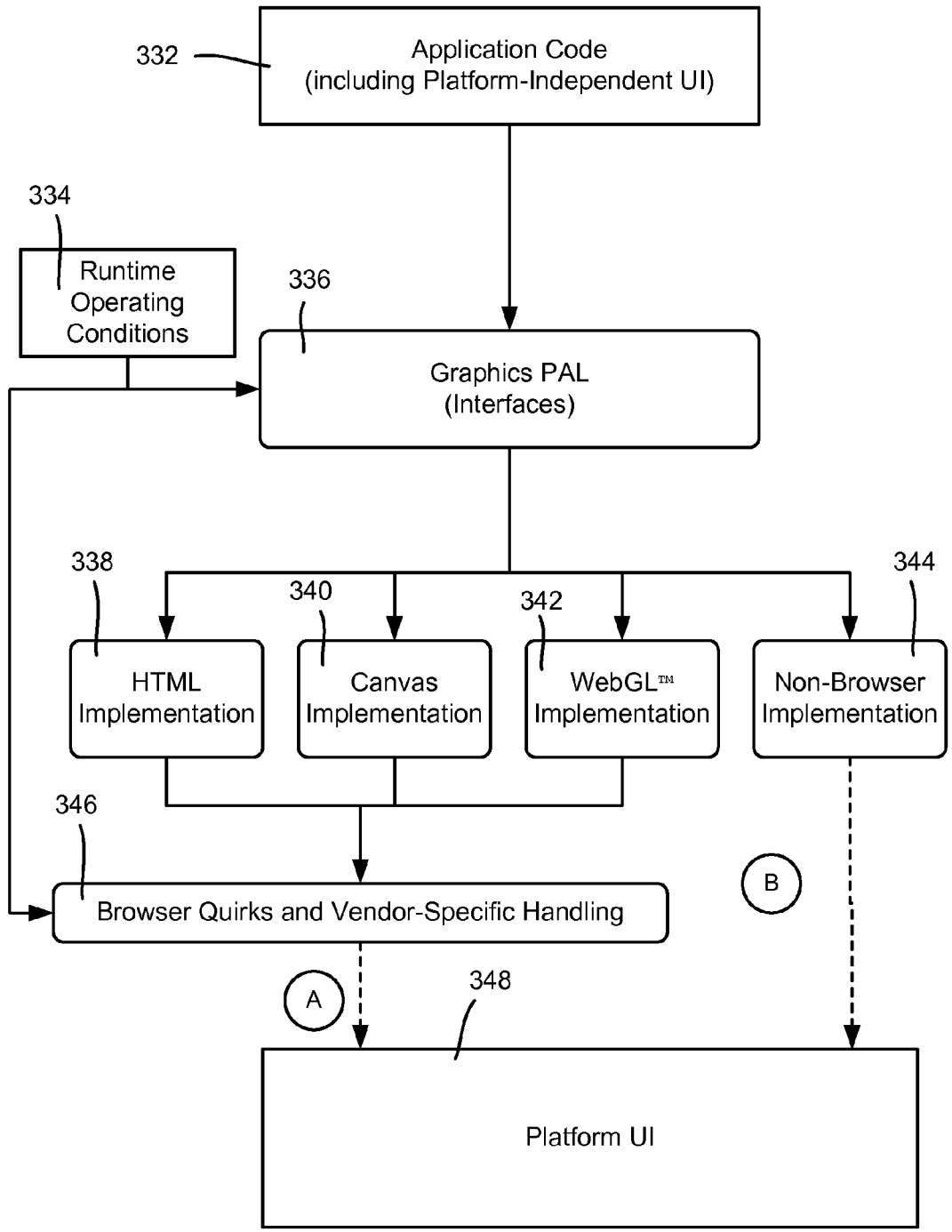
FIG. 3 is an example block diagram representation of a graphics platform abstraction layer including various implementations that may be loaded depending on the underlying platform UI, according to one or more example implementations.

FIG. 3 shows an example of application code 332 coupled to a platform UI 348 via a graphics platform abstraction layer (PAL) 336. The exemplified graphics PAL 336 includes interfaces and a mapping mechanism to a number of implementations, including an HTML implementation 338, a canvas implementation 340, a WebGL® implementation 342 and a non-browser implementation 344, e.g., for the iOS® or Android Platform® (or for example a Windows®-based platform).

As described above, which implementation to use for the non-browser implementation 344 may be known in advance when running the application using the device's operating system UI APIs rather than a browser platform. However for a browser scenario, runtime operating conditions 334 (including which browser vendor and version, whether HTML5 canvas elements and/or WebGL® are supported) may be used to decide whether to use the HTML implementation 338, the canvas implementation 340, the WebGL® implementation 342, or a combination thereof (as HTML element(s) may be drawn into a canvas element, for example).

Further the runtime operating conditions 334 may be used to adjust for various well-known (and publically documented) browser quirks and vendor-specific handling details, as represented by block 346. For example, certain vendor's browser versions return errors with certain method calls even though they should support those methods in order to be compliant with World Wide Web Consortium (W3C) standards. As one example, consider a browser version that does not properly support the method for inserting text data into the existing text of a text node. When this particular browser version is in use, the browser quirks and vendor-specific handling code can work around this, e.g., by replacing the existing child text node with a new child text node, which the browser quirks and vendor-specific handling code 346 has created with the existing text combined with the inserted text. Another alternative workaround may be to copy text from an existing DOM element, insert the text data to insert into the copied text, delete the existing text and rewrite the new combined text into the existing DOM element.

Figure 4:
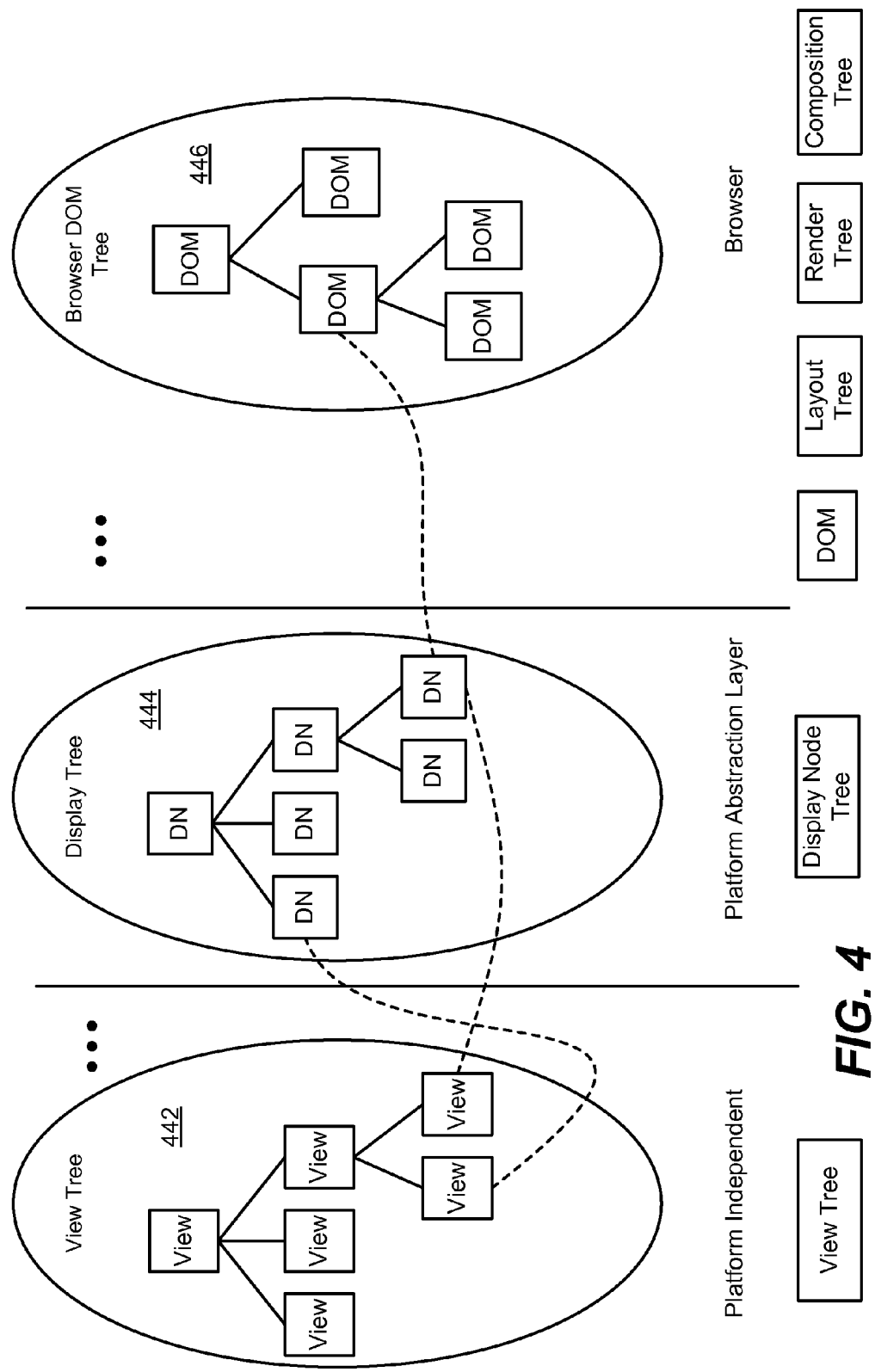
FIG. 4 is an example representation of various levels of nodes that are related to render application program output, according to one or more example implementations.

FIG. 4 summarizes how a view tree 442 maps visible node(s) to one or more nodes in the display tree 444, which in turn are mapped to a browser DOM (tree) 446 using an HTML (DOM) implementation at the platform abstraction layer. As is known, at the browser level a CSS object model may be combined with the DOM tree to apply styling to the nodes to provide a render tree.

Figure 5:
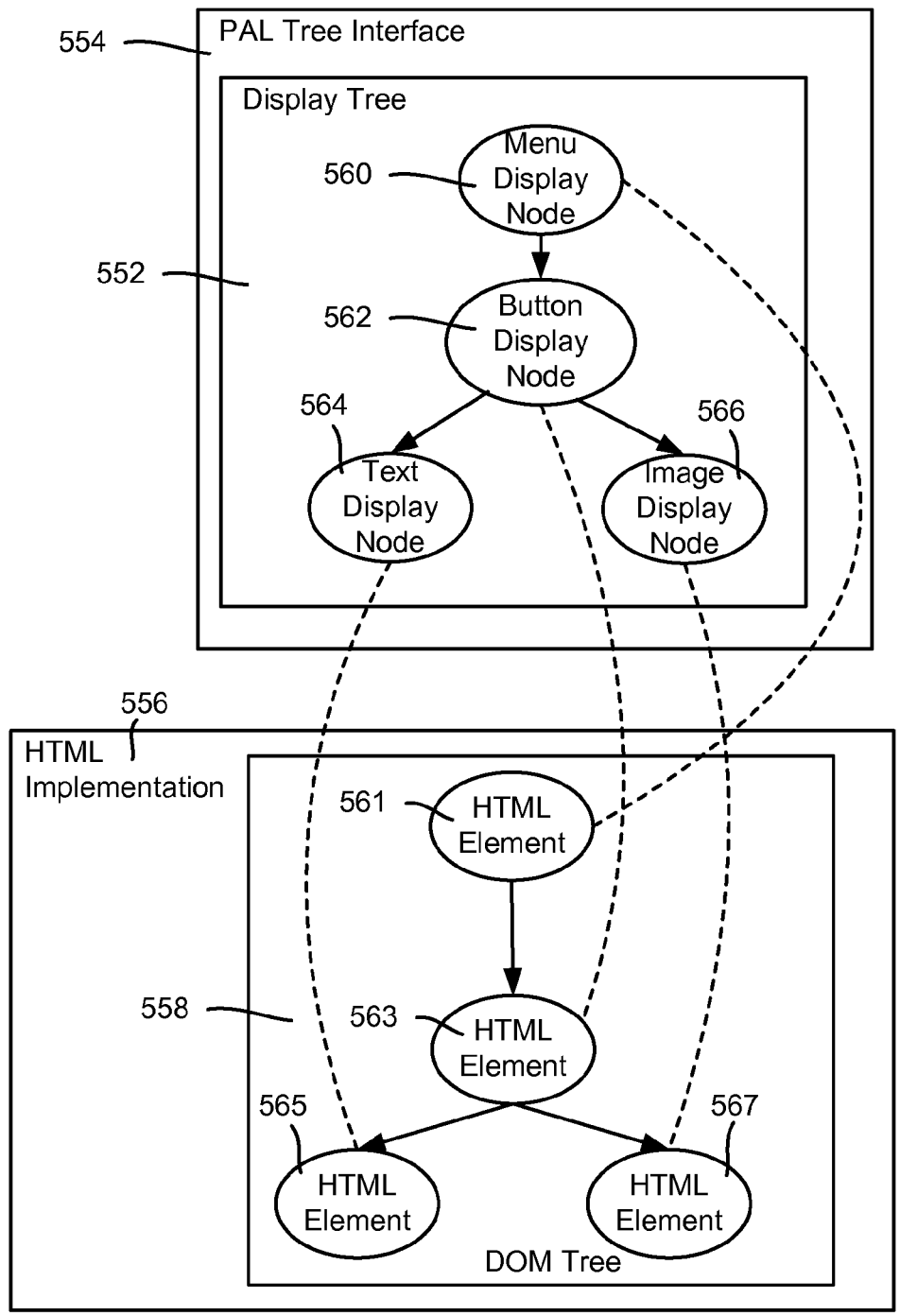
FIG. 5 is an example representation of a display tree's nodes (coupled by a graphics platform abstraction layer HTML implementation) to a Domain Object Model (DOM) tree, according to one or more example implementations.

FIG. 5 shows a set of display nodes (e.g., comprising a simple sub-tree of a larger display node tree 552) interfaced via the PAL tree interface 554 to the HTML implementation 556 that constructs and operates on a corresponding sub-tree of a DOM tree 558. For example, consider that in FIG. 5 the represented display node sub-tree has a node 560 that represents a menu (to some parent node, not shown) with a child button 562 having a text child 564 and an image child 566. By creating these nodes and calling an appropriate method for each, e.g., appendChild( ), such a corresponding element may be dynamically added as a child of a parent node element that exists in the DOM tree. Child elements may similarly be removed, e.g., via an appendChild( ) method. It is also straightforward to style any node or set of nodes in the DOM tree (e.g., via CSS) based upon methods to set styling data in the display node tree; for example, an HTML element may handle a property like "position" using CSS transforms. Thus, in this example of a DOM tree 558, any time the display node sub-tree changes, the platform abstraction layer makes the appropriate method call or calls to update the DOM tree 558, which then renders appropriately.

As can be seen, each display node maps to an HTML element; in this example the menu display node 560 maps to an HTML element 561 representing a rectangle, the button display node 562 maps to an HTML element representing a button 563 (an actual button element or an image element within the rectangle), the text display node 564 maps to an HTML element 565 representing text of the button and the image display node 566 maps to an HTML element 567 representing an image that appears along with the text within the button boundaries. Each of these elements may be styled by having the abstraction layer adjust the HTML elements' CSS object model.

For contemporary browsers that use HTML5 and/or WebGL™, canvas elements may be used. Canvas elements are created, removed and/or updated in a straightforward manner. In general, script such as JavaScript® in the display node may be used to draw into a canvas element once the canvas element is set up, e.g., with a context initialized via a method call, with calls to the canvas to set a rectangle with specified height and width properties. A canvas also may be styled, e.g., filled in with a specified color. A canvas render may handle position using a pure JavaScript® object, or a Matrix object including scale/rotation, for example.

In general, calling getContext with "2d" returns a CanvasRenderingContext2D object, whereas calling it with "WebGL™" returns a WebGL™ RenderingContext object for browsers that implement WebGL™. WebGL™, if supported on a given platform such as a contemporary computer system, provides for fast drawing of two-dimensional and three-dimensional graphics via the graphics processing unit.

Figure 6:
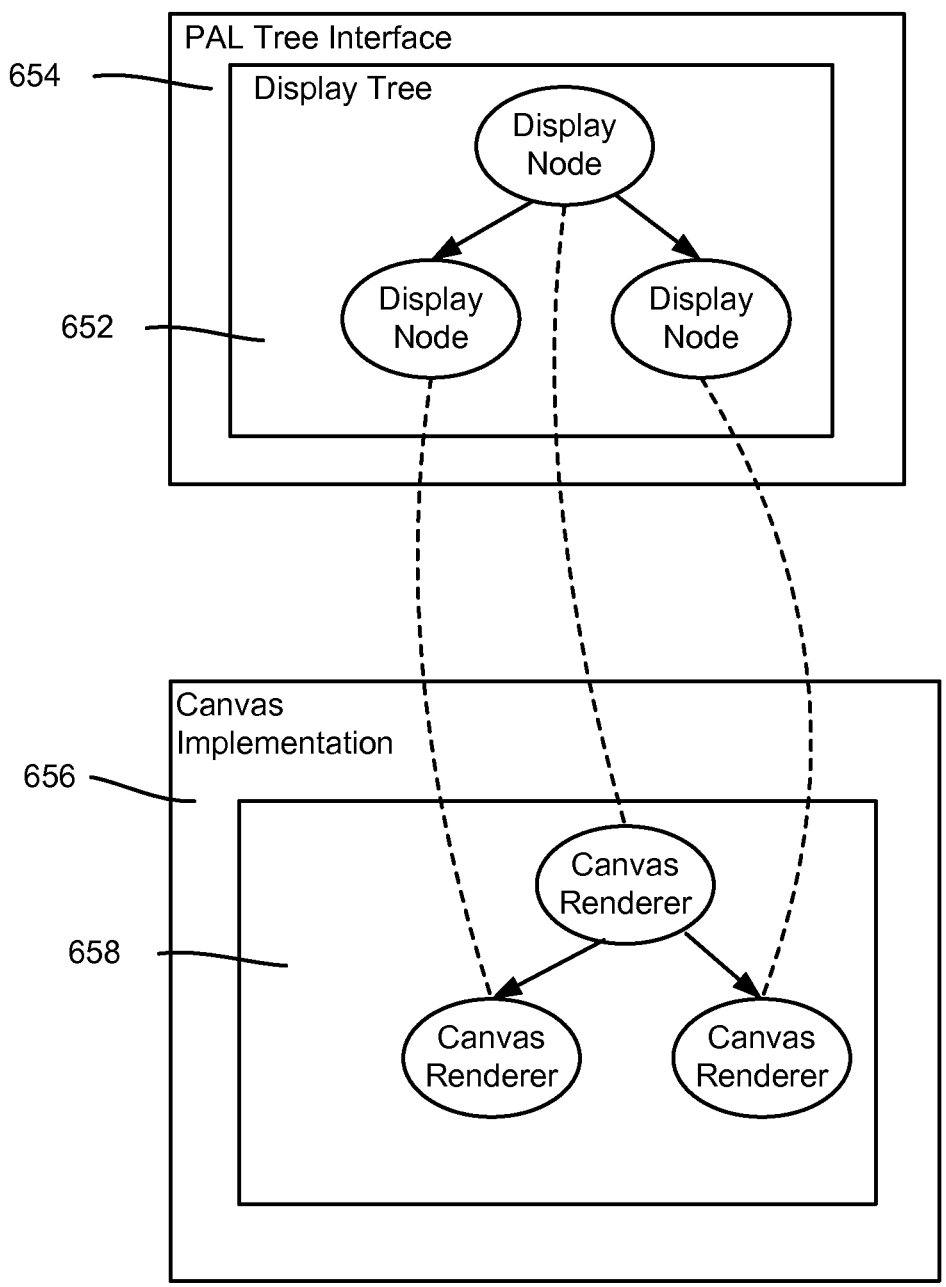
FIG. 6 is an example representation of a display tree's nodes (coupled by a graphics platform abstraction layer canvas implementation) to canvas renderers, according to one or more example implementations.

FIG. 6 shows a set of display nodes (e.g., comprising a simple sub-tree of a larger display node tree 652) interfaced via the PAL tree interface 654 to the HTML implementation 656 that constructs and operates on a corresponding sub-tree of a DOM tree 658. As can be seen, each display node maps to a canvas renderer, with the PAL canvas implementation configured to draw to the canvas renderer based upon the corresponding display node's contents. Note that it also is feasible to draw a bitmap in advance, and transfer the bitmap to a canvas. To this end, an image comprising a video or an image object may be constructed in JavaScript® and a drawImage call used to draw the image which may be transferred to the canvas element.

It is feasible for an entire display node tree to be output into a single canvas element. However, in many UI scenarios this may be inefficient, because with a single canvas element the entire display node tree may need to be reprocessed for rendering any time any display node changes, which may happen frequently. For example, a simple focus change may change the display tree so as to highlight one visible representation of a tile view or button view instead of another, and a user may make many rapid focus changes, e.g., by holding down a cursor/arrow keyboard key to change the focused item, e.g., within a item view container having a large number of items.

Figure 7:
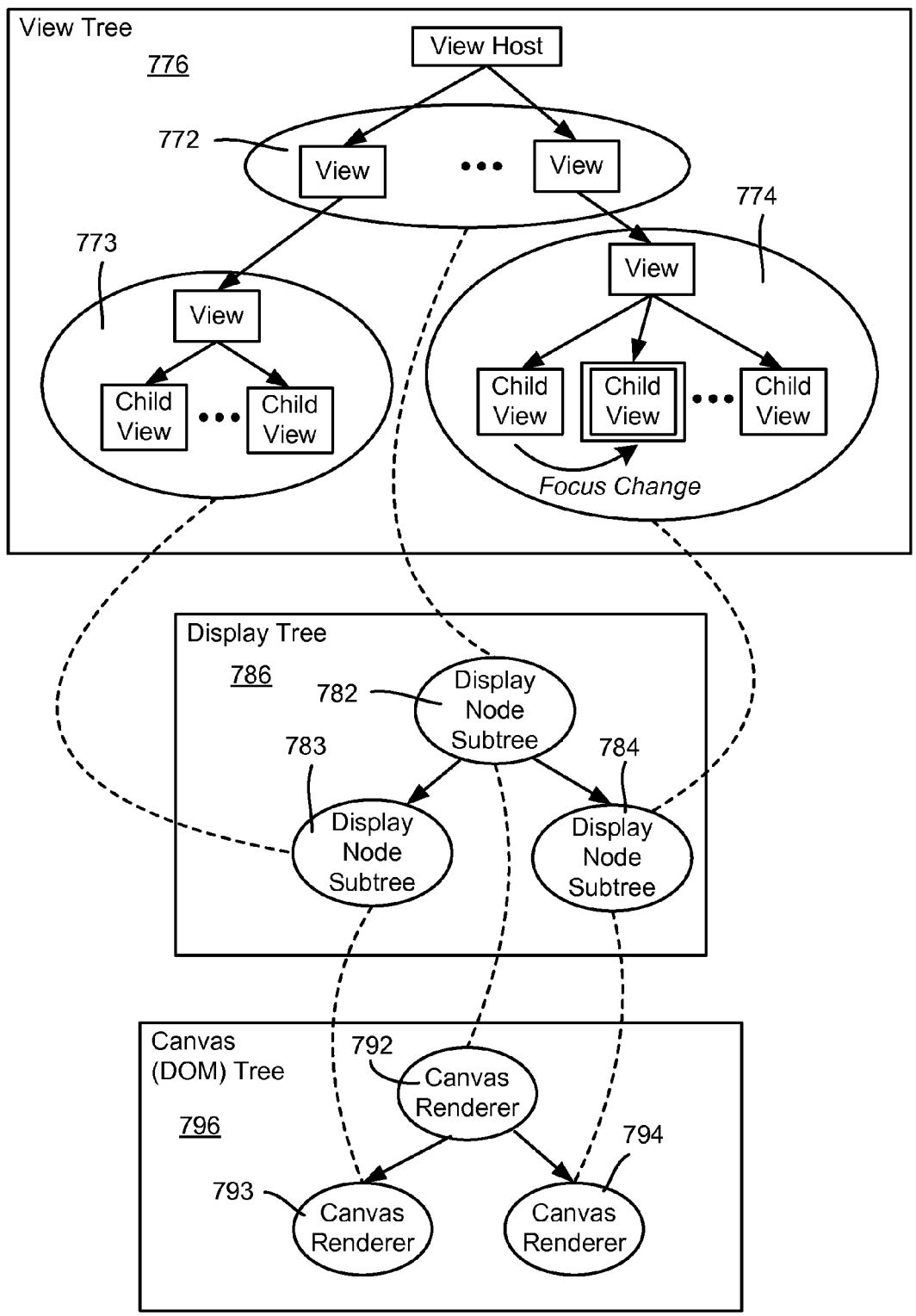
FIG. 7 is an example representation of a view tree's nodes being divided into sub-trees for outputting to display sub-trees corresponding to canvas renderers, according to one or more example implementations.

An alternative to having a single canvas element is to have multiple canvas elements, e.g., corresponding to different sub-trees of the display tree, as generally represented in FIG. 7. For example, consider a menu view (items container view) where the user is rapidly changing focus among the menu's items, e.g., by holding down a cursor/arrow key. A focus change may result in the previously focused view to change its appearance to indicate the non-focused state and the newly focused view to also change its appearance to indicate the focused state, which changes the display tree.

In the example of FIG. 7, different subsets of view nodes (sub-trees) 772-774 in the view tree 776 may be mapped to different subsets of display nodes (sub-trees) 782-784 in the display node tree 766, which in turn may be mapped to different canvas renderer elements 792-794 in the canvas renderers of the canvas renderer (DOM) tree 796. In this way, when a view and/or its children changes in some way, the entire display node tree need not be redrawn, but rather, only some sub-tree portion thereof that corresponds to and includes the affected nodes. In the example of FIG. 7, it is seen that the focus change occurs in the view tree 774 which changes the display node tree 784; only the one canvas element/renderer 794 needs to redraw to reflect the focus change output.

For non-browser underlying UI platforms, display nodes via the PAL tree interfaces result in the non-browser implementation creating and manipulating the platform's (framework's) UI objects, which are well documented. For example, in Android, well-documented APIs, classes and methods may be used to draw to a device's screen. These include a Rect class for creating a rectangle based upon size properties, a Paint class for text rendering with desired colors and styles, a Canvas class having methods for drawing a bitmap of pixels, a canvas to host the draw calls (writing into the bitmap), a drawing primitive (e.g. Rect, Path, text, Bitmap), and a paint (to describe the colors and styles for the drawing). A Matrix object may be used for transforming coordinates/scaling.

Figure 8:
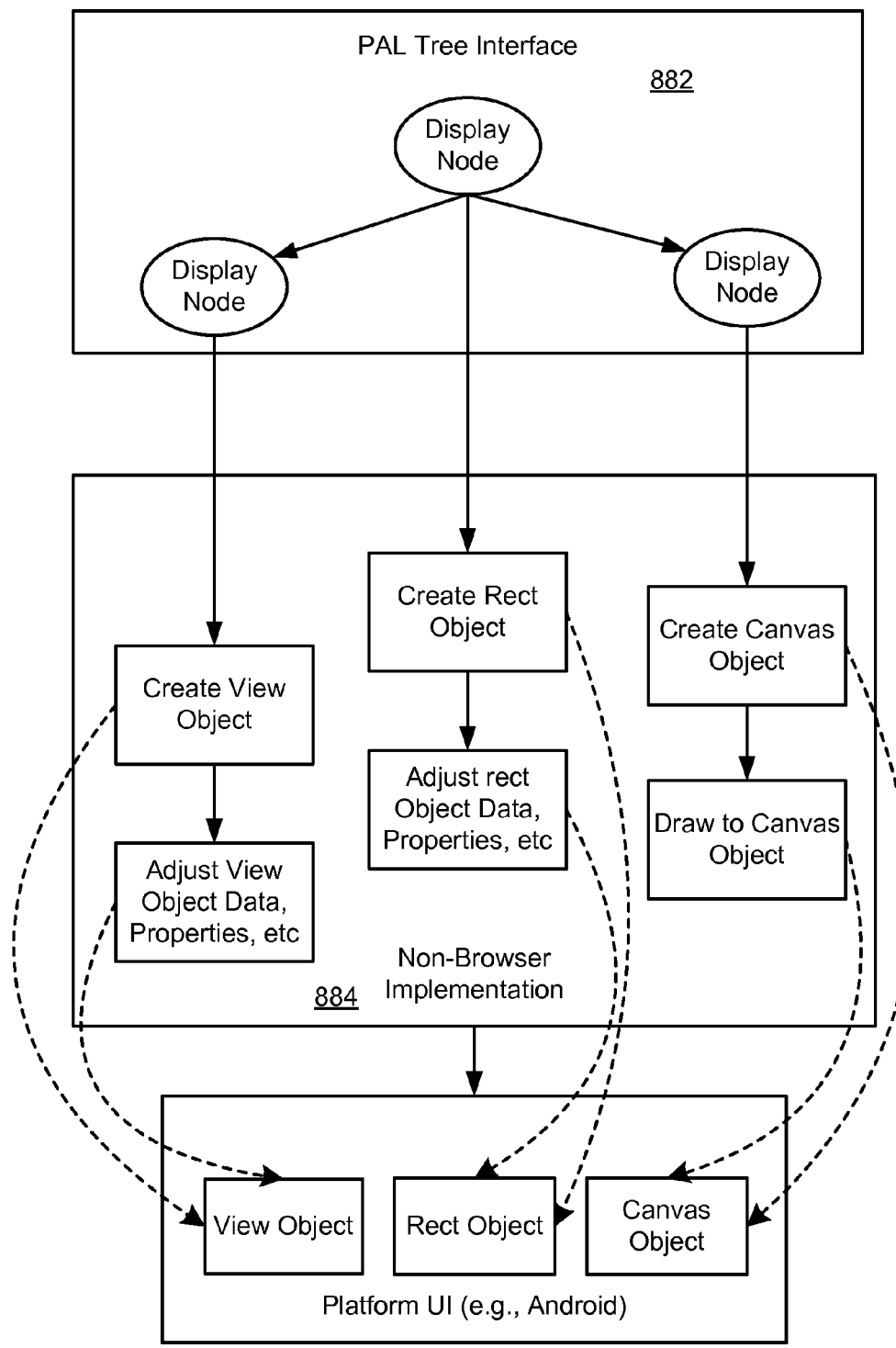
FIG. 8 is an example representation of a display tree's nodes (coupled by a graphics platform abstraction layer non-browser implementation) to a platform operating system's UI objects, according to one or more example implementations.

These concepts are generally represented in FIG. 8, in which the Android™ platform 880 provides a view class, a rect class, a canvas class and so on, from which objects may be created and adjusted for the display nodes of the display tree by the PAL tree interface 882 and an appropriate Android-based non-browser implementation 884. The Android-based non-browser implementation 884 is thus straightforward, and may create and use any or all of these objects as well as others; offline evaluations or the like may be used to determine which Android UI objects are more efficient to create and use for given scenarios/devices.

iOS® similarly provides a view object for rendering content. In iOS, the UI kit's well-documented classes (e.g., UIView) have methods that allow for drawing. The setNeedsDisplay or setNeedsDisplayInRect method of an iOS view object instructs that view to redraw. Thus, updating is straightforward, e.g., by drawing a bitmap via JavaScript® and then outputting that bitmap to a UIView object. Again, because the complex UI operations are performed at the view level, the non-browser implementation abstraction layer implementations are straightforward.

Figure 9:
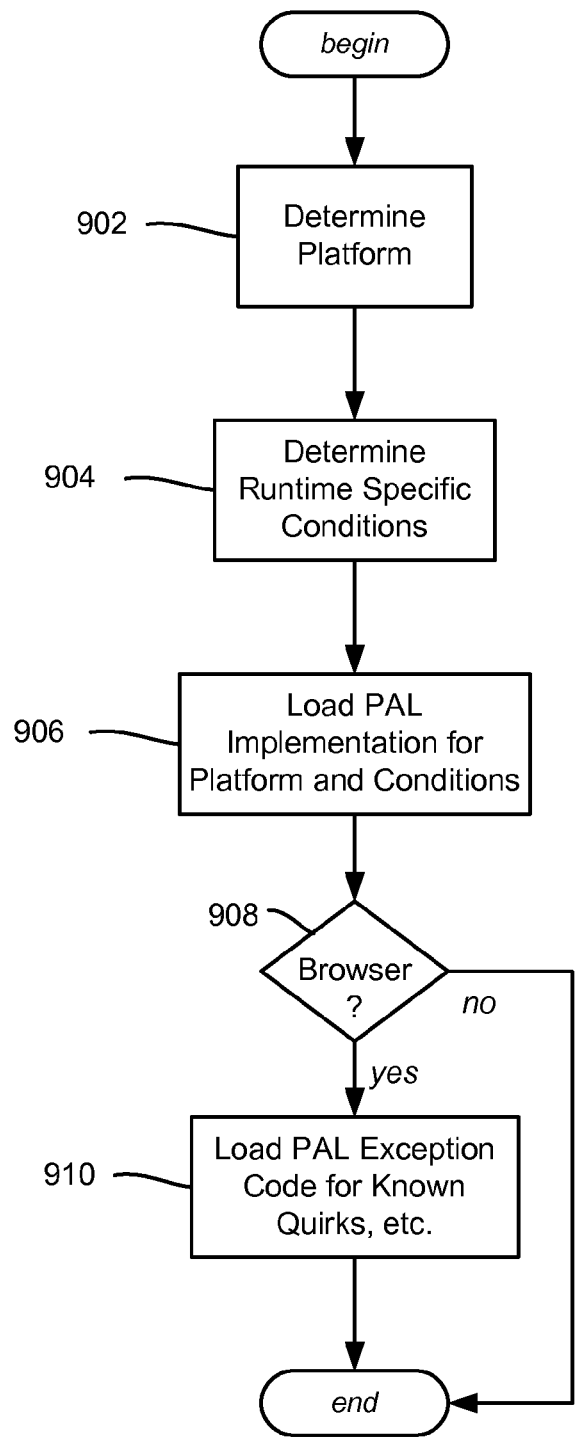
FIG. 9 is a flow diagram showing example steps related to preparing a graphics platform abstraction layer for use, including loading an implementation based upon the underlying platform, according to one or more example implementations.

FIG. 9 is a flow diagram showing example steps that may be taken by logic incorporated into (or coupled to) a graphics platform abstraction layer as described herein. Step 902 represents determining the underlying platform that is being used beneath application program code. This is generally a runtime condition, as the application may be hosted/run via browser code, or run over the device's non-browser UI platform without an intervening browser, for example. Step 904 represents determining any other runtime conditions; for example, a browser hosting an application may support WebGL™, but the device hardware may not support it.

Step 906 loads (e.g., instantiates the objects for) the PAL implementation based upon the underlying platform and current conditions. For browser implementations, steps 908 and 910 load the code/data that deals with the exceptions that result from known quirks, vendor specific details and so forth. Note that it is also feasible to adjust to known quirks for a non-browser implementation should any such quirks be known, such as among different device types, operating system versions and/or due to known conditions (e.g., a low-memory condition) and so on as long as such information is available.

Figure 10:
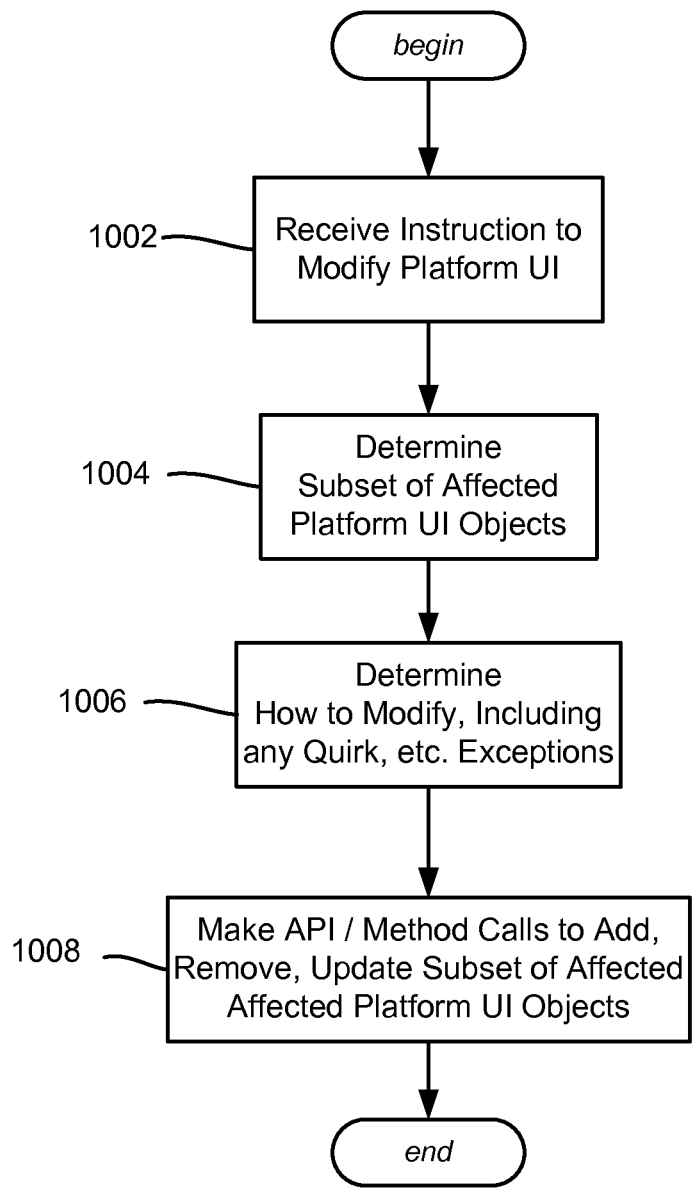
FIG. 10 is a flow diagram showing example steps related to interfacing with an underlying platform, according to one or more example implementations.

FIG. 10 is directed towards the graphics platform abstraction layer being instructed to take action to modify the set of platform UI object(s) based upon a change or the like to one or more display nodes, beginning at step 1002 where a create and/or update instruction (e.g. via a method call) is received at a PAL interface. Step 1004 determines the subset of affected platform object(s).

Step 1006 represents the platform abstraction layer implementation determining what needs to be done to modify the set of platform object(s); this may include handling any exceptions due to quirks or the like as exemplified above. For example, a platform UI object may already exist for the display node, but may need to be deleted and replaced with a new one if a quirk makes it not possible to update the data of the platform UI object via a standard method call. Step 1008 represents making the API/method calls to the platform interface to add/remove/update the subset of affected objects.

Figure 11:
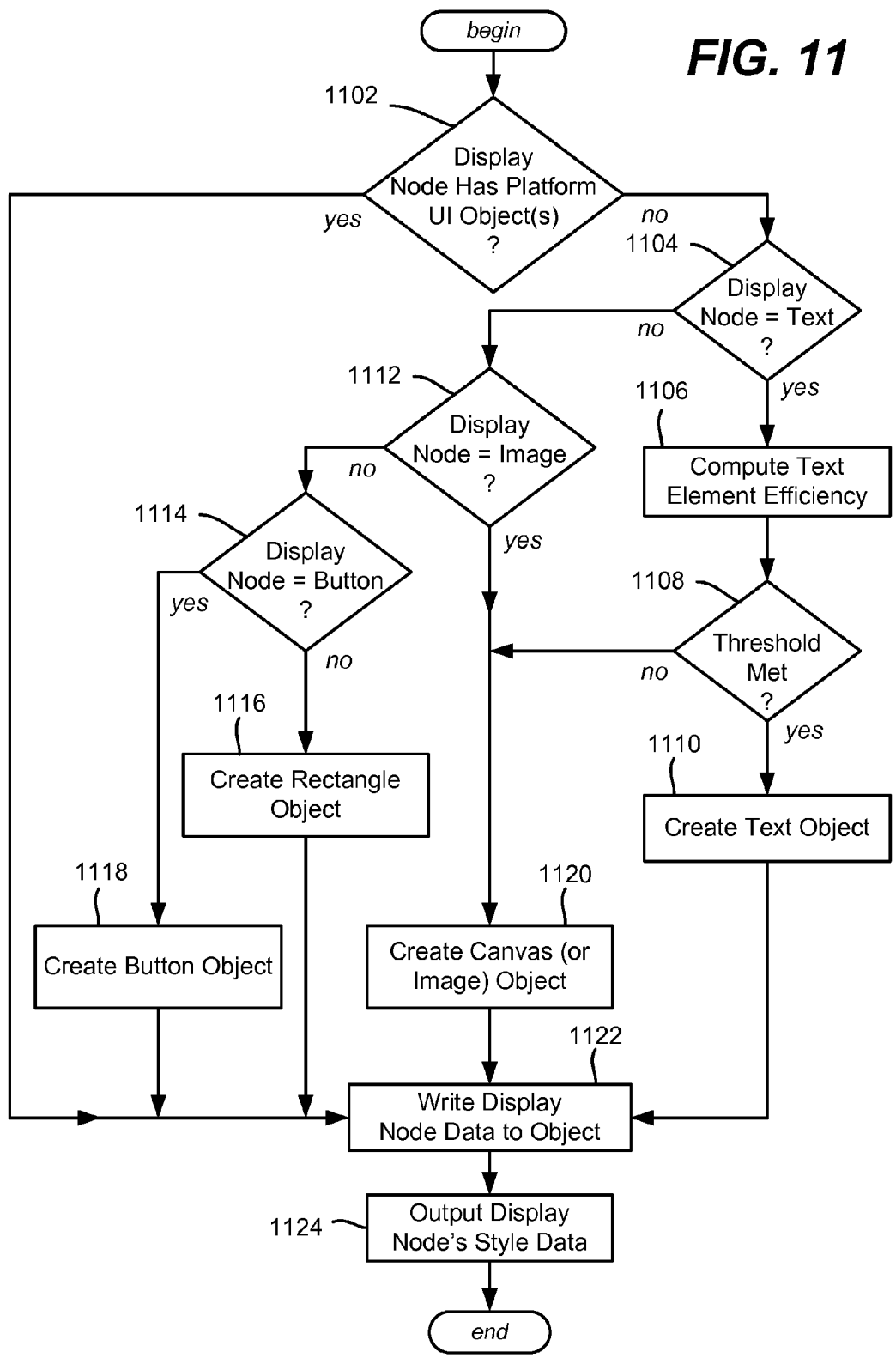
FIG. 11 is a flow diagram showing example steps that may be taken by an HTML implementation to couple display tree nodes to an underlying HTML-based platform's DOM objects, according to one or more example implementations.

A simple example of some logic that an HTML implementation may use to determine operations to perform (e.g., corresponding to part of step 1006 of FIG. 10) is described with reference to FIG. 11. In FIG. 11, consider that an HTML implementation is configured to create and/or update browser platform (DOM) text objects, image (or canvas) objects, button objects or rectangle objects for a call resulting from processing a node of the display node tree. Because the view-level UI is platform independent, the call to the platform abstraction layer's interface may simply identify the type of display node (text, image, button or rectangle), the data to write to the platform object, and the style properties to apply to the platform object/data. Note that instead of identifying the type of display node with the call, it is alternatively feasible to use the display node's type to determine which method of the platform abstraction layer's interface to call, e.g., to call a text method, an image method, a button method or a rectangle method. Further note that FIG. 11 is directed towards creation and/or updating of a DOM object for a display node; straightforward logic may be used to remove a DOM object, and removal is not described herein for purposes of brevity. Also, for purposes of brevity, a single platform DOM element/object is described as corresponding to an affected display node, however it is understood that a set DOM element/objects may correspond to a single display node.

Step 1102 evaluates whether the display node already has a corresponding platform object in the platform UI, e.g., an element in the DOM tree in this example; (note that as described herein, a quirk may have caused removal of what was an existing DOM element for this display node). If a DOM element already exists, then the display node data is written to the DOM element at step 1122, and/or the display node's style data output, e.g., to the CSS object model at step 1124. Note that a view's/domain node's style may not change, and thus step 1124 may be skipped if this information is provided to and/or maintained at the platform abstraction layer. Further note that it is feasible to restyle a view/display node/object element without changing its data, e.g., a view in the focused state may have different style property values than when not in the focused state; thus step 1122 sometimes may be bypassed if appropriate.

Returning to step 1102, consider that no element exists for the display node, and thus (at least) one needs to be created. Step 1104 evaluates whether the display node is a text type of node, and if not, branches to step 1112 to further evaluate the node type. If the display node is a text node, consider that in this example whether or not to use a text node or render the text as pixels (in an image or canvas object) depends on some criteria, e.g. how efficient it is to use a text node versus not, such as based upon the amount of text and likelihood of scrolling as described above. If the criterion/criteria efficiency is met at step 1108, step 1110 creates a text element in the DOM tree for the display node. Otherwise step 1120 creates an image or canvas DOM element for writing pixels that will appear as the text data.

Returning to step 1104, if a DOM element needs to be created and the display node is not a text node, step 1112 evaluates whether the display node is an image. If so, a corresponding canvas or image DOM element is created for the display node, with the image written at step 1122 and style (if specified) at step 1124.

In this example, if not a text display node or an image display node, the remaining possibilities are button or rectangle. If not a button display node at step 1116 creates a rectangle DOM element, with any data (generally there is none) written to the Dom element at step 1122, and the style data (e.g., background color, border and so on) applied via step 1124. Otherwise a button DOM element is created at step 1118, with its data (e.g., button text) written at step 1122 and styling data output at step 1124.

As can be seen from the simple browser HTML implementation example of FIG. 11, a change to the display node tree that updates or adds a new display node results in the abstraction layer making API calls to modify the DOM tree. Similar logic may be used for other browser or non-browser implementations, except that in a pure canvas model, one or more display nodes are mapped to a canvas whereby there is no need to distinguish between types of display nodes as they are each processed into pixels.

Figure 12:
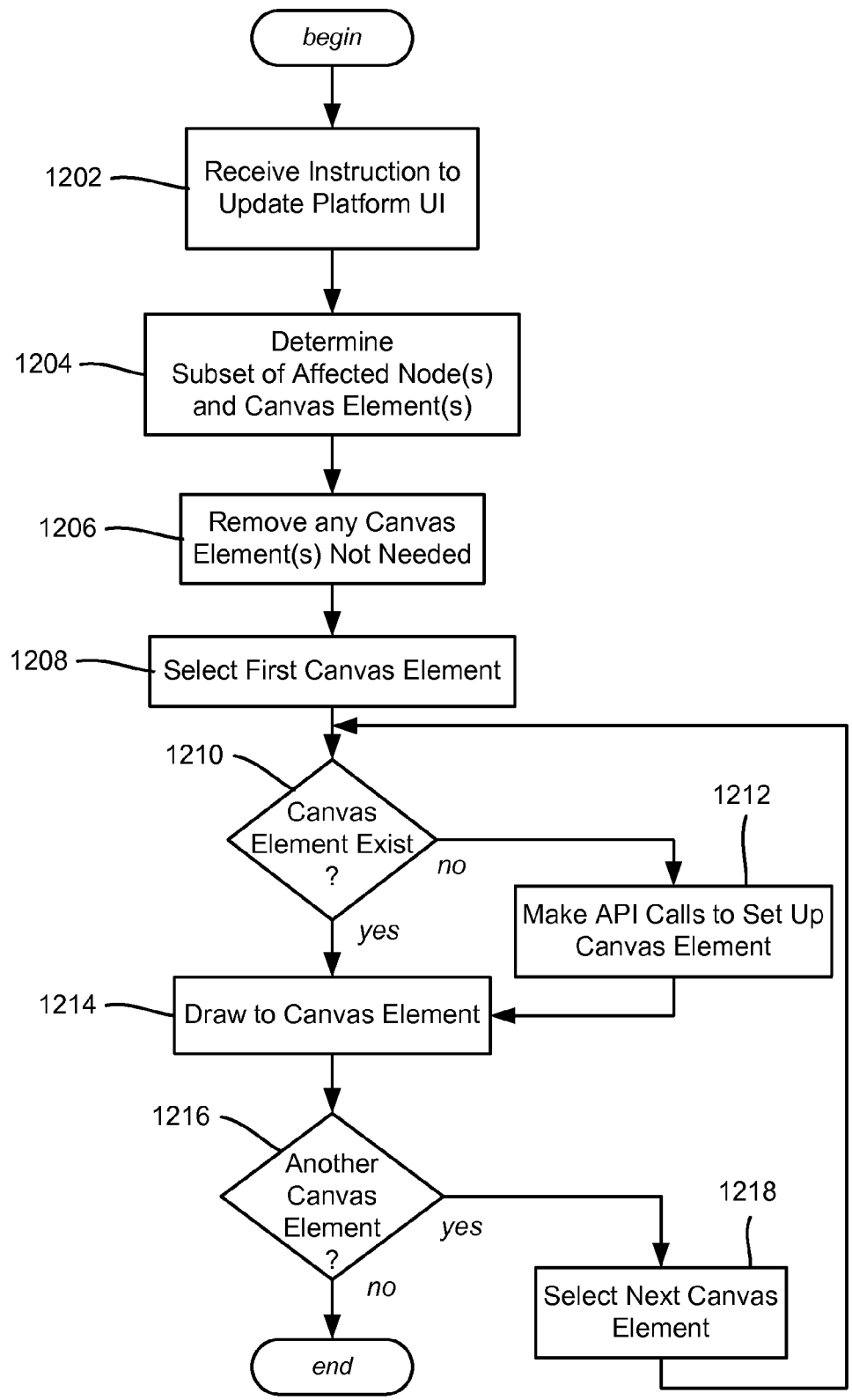
FIG. 12 is a flow diagram showing example steps that may be taken by a canvas implementation to couple display tree nodes to one or more canvas elements, according to one or more example implementations.

FIG. 12 shows how a display node tree having one or more sub-trees (as exemplified in FIG. 7) mapped to one or more canvas elements may be processed. Step 1202 represents receiving a call at the platform abstraction layer to update the platform UI, and step 1204 determines the subset of affected display nodes and canvas elements. In the focus change example of FIG. 7, it is seen that the view subset 774 corresponding to a display node sub-tree 784 is affected and that this maps to the canvas element 794. However, there are many situations in which display nodes may be affected that map to more than one canvas element, e.g., the focus change may be from a child view represented in one display node sub-tree to a child view represented in a different display node sub-tree, whereby in the example of FIG. 7 two canvas elements are affected.

Step 1206 represents removing any canvas element(s) that are not needed. For example, a change to a different view menu change may result in an entire view being replaced whereby that view's corresponding display node(s) canvas element(s) need to be removed and replaced as well.

Step 1208 selects the first canvas element that is affected by the display node tree change; this may be a canvas element that needs to be created, and if so step 1210 branches to step 1212 to create the canvas element and initialize it, e.g., with a context.

Step 1214 draws to the canvas element. Steps 1216 and 1218 repeat the process for any other affected canvas elements, including any that need to be created based upon the display node tree change or changes.

As can be seen, the technology described herein leverages platform abstraction layer concepts with a platform independent application program UI to solve browser compatibility issues and enable efficient deployment to non-browser platforms. A web platform-based application can be implemented using various graphics capabilities of the platform, and those capabilities can have differences between them, e.g., depending on the web platform vendor and/or version.

A developer/designer is thus able to write an application program against a platform abstraction layer, even when the target platform is a web platform. This approach also has the benefit of allowing the code above the platform abstraction layer to work against other non-web client based platforms such as native operating system UI frameworks.

The technology described herein thus has many benefits. Including, but not limited to, the ability to design unified application code independent of the backing technology or platform and the ability to choose more optimally performing technology for a given device without rewriting application code. Further, the technology described herein deals with browser quirks and vendor specific differences without affecting application code, allows an application program to easily move to non-browser platforms, and allows the display tree/platform abstraction layer to be the "ground truth" for layout/display properties, circumventing round trips to the underlying platform to obtain layout/display property information.

One or more aspects are directed towards coupling a display node tree corresponding to an application program's output to an underlying graphics platform, including determining, at a graphics platform abstraction layer, an implementation for the underlying platform. Further described is, via the implementation, processing information represented by each node of a selected set of one or more display nodes of the display node tree for calling an object interface of the underlying graphics platform, to provide the platform user interface code with data for rendering a representation of the data.

Coupling the display node tree to the underlying graphics platform may include calling one or more interfaces the graphics platform abstraction layer from view objects of a platform-independent view tree of the application program to provide the display node tree. Processing the information may include translating an operation identified in a display node of the selected set into an API call of an object of the underlying graphics platform.

Determining the implementation may include evaluating at least one runtime operating condition. Evaluating the at least one runtime operating condition may determine that the application is not running in a browser, determining the implementation for the underlying platform may include loading a non-browser implementation, and processing the information represented by each node of the selected set of one or more display nodes of the display node tree may include calling to a UI object of the operating system. Evaluating the at least one runtime operating condition may include determining that the application is running in a browser and determining the implementation for the underlying platform comprises loading a browser implementation. Quirk handling code may be loaded based upon a version of the browser, and vendor-specific handling code may be loaded based upon a vendor of the browser.

Processing the information represented by each node of the selected set of one or more display nodes of the display node tree may include calling to a canvas renderer object or calling to a Web Graphics Library (WebGL™) object. Processing the information may include calling to a Domain Object Model (DOM) object; if so, processing the information may include determining that a display node corresponds to text data and determining whether to create a DOM text element or a DOM image or canvas element for calling to with the text data.

One or more aspects are directed towards a graphics platform abstraction layer including an interface set and an implementation. A display node tree has nodes representing user interface (UI) view objects, with the platform abstraction layer configured to interface nodes of the display node tree to objects of an underlying platform via the implementation, including to provide data and operations to the objects of the underlying platform for rendering a representation of the nodes of the display node tree.

The interface set of the graphics platform abstraction layer may couple platform-independent program view objects to nodes of the display node tree. The display nodes may correspond to output of an application program hosted in a browser; if so, the graphics platform abstraction layer selects the implementation as at least one of an HTML implementation, a canvas implementation and/or a Web Graphics Library (WebGL™) implementation.

The graphics platform abstraction layer may load quirk handling code based upon a browser version, a browser vendor or both a browser version and browser vendor. The underlying platform may comprise an Android™ platform, an iOS® platform or a Windows®-based platform.

One or more aspects are directed towards determining an underlying platform corresponding to a browser that hosts an application program or to an operating system upon which an application program runs, and loading an implementation based upon the underlying platform into a graphics platform abstraction layer. Further described is interfacing the application program to the implementation, including obtaining information corresponding to user interface (UI) output from the application program at the graphics platform abstraction layer, and calling from the implementation to objects of the underlying platform to render a representation of the UI output from the application program.

If the underlying platform corresponds to a browser, quirk handling code may be loaded at the graphics platform abstraction layer based upon a vendor and/or version of the browser. If the underlying platform corresponds to a browser, the implementation may call to objects of the underlying platform, including calling to a DOM HTML element, calling to a canvas element or calling to a WebGL™ element.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 13 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 13:
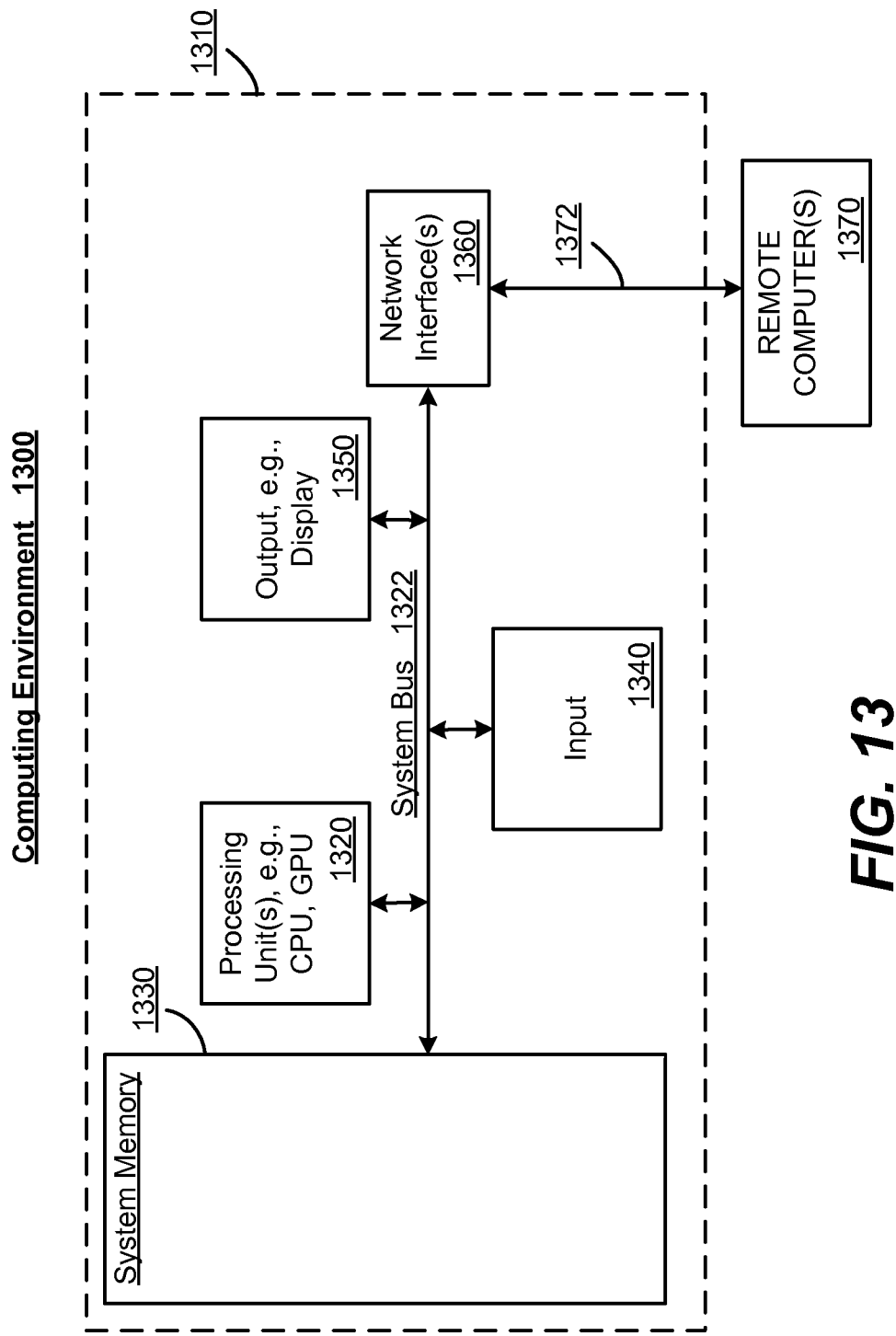
FIG. 13 is a block diagram representing an example computing environment into which aspects of the subject matter described herein may be incorporated.

FIG. 13 thus illustrates an example of a suitable computing system environment 1300 in which one or aspects of the implementations described herein can be implemented, although as made clear above, the computing system environment 1300 is only one example of a suitable computing environment and is not intended to suggest any limitation as to scope of use or functionality. In addition, the computing system environment 1300 is not intended to be interpreted as having any dependency relating to any one or combination of components illustrated in the example computing system environment 1300.

With reference to FIG. 13, an example device for implementing one or more implementations includes a general purpose computing device in the form of a computer 1310. Components of computer 1310 may include, but are not limited to, a processing unit 1320, a system memory 1330, and a system bus 1322 that couples various system components including the system memory to the processing unit 1320.

Computer 1310 typically includes a variety of machine (e.g., computer) readable media and can be any available media that can be accessed by a machine such as the computer 1310. The system memory 1330 may include computer storage media in the form of volatile and/or nonvolatile memory such as read only memory (ROM) and/or random access memory (RAM), and hard drive media, optical storage media, flash media, and so forth; as used herein, machine readable/computer readable storage media stores data that does not include transitory signals, (although other types of machine readable/computer readable media that is not storage media may). By way of example, and not limitation, system memory 1330 may also include an operating system, application programs, other program modules, and program data.

A user can enter commands and information into the computer 1310 through one or more input devices 1340. A monitor or other type of display device is also connected to the system bus 1322 via an interface, such as output interface 1350. In addition to a monitor, computers can also include other peripheral output devices such as speakers and a printer, which may be connected through output interface 1350.

The computer 1310 may operate in a networked or distributed environment using logical connections to one or more other remote computers, such as remote computer 1370. The remote computer 1370 may be a personal computer, a server, a router, a network PC, a peer device or other common network node, or any other remote media consumption or transmission device, and may include any or all of the elements described above relative to the computer 1310. The logical connections depicted in FIG. 13 include a network 1372, such as a local area network (LAN) or a wide area network (WAN), but may also include other networks/buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:
1. A method comprising:
generating, by a processor, a first mapping between view tree nodes of a view tree to display nodes of a display node tree, wherein the view tree nodes represent platform independent user interface view objects of one or more applications, and the display nodes represent abstract layer objects corresponding to the platform independent user interface view objects;
generating, by the processor, a second mapping between display nodes of the display node tree to platform dependent nodes of one or more platform dependent trees, wherein the platform dependent nodes represent platform dependent user interface view objects, wherein the abstract layer objects process data from the platform independent user interface view objects for use by the platform dependent user interface view objects;
determining, by the system, a platform on which an application of the one or more applications is to be executed; and
based on the platform, employing, by the processor, the first mapping and the second mapping to process a first set of platform independent user interface view objects associated with a second set of one or more view tree nodes of the view tree corresponding to the application to be executed for calling a third set of platform dependent user interface view objects associated with a fourth set of one or more platform dependent nodes of a platform dependent tree associated with the platform for rendering a representation of the data.

2. The method of claim 1, wherein the employing the first mapping and the second mapping comprises:
employing the first mapping to identify a fifth set of one or more display nodes of the display node tree corresponding to the second set of one or more view tree nodes of the view tree corresponding to the application is to be executed;
employing the second mapping to identify the fourth set of one or more platform dependent nodes of the platform dependent tree of the one or more platform dependent trees corresponding to the fifth set of one or more display nodes of the display node tree; and
processing, by a sixth set of abstract layer objects associated with the fifth set of one or more display nodes, the first set of platform independent user interface view objects for calling the third set of platform dependent user interface view objects.

3. The method of claim 1, wherein determining the platform comprises further comprises:
determining whether the platform on which the application is to be executed is a browser implementation or a non-browser implementation; and
in response to determining that the platform is a non-browser implementation, selecting the platform dependent tree of the one or more platform dependent trees corresponding to the platform; and
in response to determining that the platform is a browser implementation:
determining a browser on which the application is to be executed, and
selecting the platform dependent tree of the one or more platform dependent trees corresponding to the platform and the browser.

4. The method of claim 3, further comprising evaluating, by the processor, at least one runtime operating condition.

5. The method of claim 4, wherein the evaluating the at least one runtime operating condition comprises determining a version of the browser.

6. The method of claim 5, further comprising, loading quirk handling code based upon a version of the browser.

7. The method of claim 5, further comprising, loading vendor-specific handling code based upon a vendor of the browser.

8. The method of claim 3, wherein the browser employs a platform dependent user interface view object that is a canvas renderer object.

9. The method of claim 3, wherein the browser employs at least one platform dependent user interface view object that is a Domain Object Model (DOM) object.

10. The method of claim 9, wherein processing the data includes determining that a display node corresponds to text data, and further comprising, determining whether to call a platform dependent user interface view object that is a DOM object text element or a DOM object image or canvas element with the text data.

11. A system comprising:
a processor; and
a memory communicatively coupled to the processor, the memory having stored therein computer-executable instructions, comprising:
a graphics platform abstraction layer configured to:
generate a first mapping between view tree nodes of a view tree to display nodes of a display node tree, wherein the view tree nodes represent platform independent user interface view objects of one or more applications, and the display nodes represent abstract layer objects corresponding to the platform independent user interface view objects;
generate a second mapping between display nodes of the display node tree to platform dependent nodes of one or more platform dependent trees, wherein the platform dependent nodes represent platform dependent user interface view objects, wherein the abstract layer objects process data from the platform independent user interface view objects for use by the platform dependent user interface view objects;
determine a platform on which an application of the one or more applications is to be executed; and
based on the platform, employ the first mapping and the second mapping to process a first set of platform independent user interface view objects associated with a second set of one or more view tree nodes of the view tree corresponding to the application is to be executed for calling a third set of platform dependent user interface view objects associated with a fourth set of one or more platform dependent nodes of a platform dependent tree associated with the platform for rendering a representation of the data.

12. The system of claim 11, wherein the graphics platform abstraction layer is further configured to:
employ the first mapping to identify a fifth set of one or more display nodes of the display node tree corresponding to the second set of one or more view tree nodes of the view tree corresponding to the application is to be executed;
employ the second mapping to identify the fourth set of one or more platform dependent nodes of the platform dependent tree of the one or more platform dependent trees corresponding to the fifth set of one or more display nodes of the display node tree; and
process, by a sixth set of abstract layer objects associated with the fifth set of one or more display nodes, the first set of platform independent user interface view objects for calling the third set of platform dependent user interface view objects.

13. The system of claim 11, wherein the graphics platform abstraction layer is further configured to:
determine whether the platform on which the application is to be executed is a browser implementation or a non-browser implementation;
based on a first determination that the platform is a non-browser implementation, select the platform dependent tree of the one or more platform dependent trees corresponding to the platform; and
based on a second determination that the platform is a browser implementation:
determine a browser on which the application is to be executed, and
select the platform dependent tree of the one or more platform dependent trees corresponding to the platform and the browser.

14. The system of claim 13 wherein the graphics platform abstraction layer is further configured to load quirk handling code based upon at least one of a version of the browser or a vendor of the browser.

15. The system of claim 11, wherein at least a subset of the platform dependent trees respectively correspond to distinct operating systems.

16. A non-transitory computer-readable medium having instructions stored thereon that, in response to execution, cause a system including a processor to perform operations comprising:
- generating a first mapping between view tree nodes of a view tree to display nodes of a display node tree, wherein the view tree nodes represent platform independent user interface view objects of one or more applications, and the display nodes represent abstract layer objects corresponding to the platform independent user interface view objects;
- generating a second mapping between display nodes of the display node tree to platform dependent nodes of one or more platform dependent trees associated with respective platforms, wherein the platform dependent nodes represent platform dependent user interface view objects, wherein the abstract layer objects process data from the platform independent user interface view objects for use by the platform dependent user interface view objects;
- determining a platform on which an application of the one or more applications is to be executed; and
- based on the platform, employing the first mapping and the second mapping to process a first set of platform independent user interface view objects associated with a second set of one or more view tree nodes of the view tree corresponding to the application is to be executed for calling a third set of platform dependent user interface view objects associated with a fourth set of one or more platform dependent nodes of a platform dependent tree associated with the platform for rendering a representation of the data.

17. The non-transitory computer-readable medium of claim 16, wherein the employing the first mapping and the second mapping comprises:
- employing the first mapping to identify a fifth set of one or more display nodes of the display node tree corresponding to the second set of one or more view tree nodes of the view tree corresponding to the application is to be executed;
- employing the second mapping to identify the fourth set of one or more platform dependent nodes of the platform dependent tree of the one or more platform dependent trees corresponding to the fifth set of one or more display nodes of the display node tree; and
- processing, by a sixth set of abstract layer objects associated with the fifth set of one or more display nodes, the first set of platform independent user interface view objects for calling the third set of platform dependent user interface view objects.

18. The non-transitory computer-readable medium of claim 16, wherein at least a subset of the platform dependent trees respectively correspond to distinct operating systems.

19. The non-transitory computer-readable medium of claim 16, wherein the determining the platform comprises further comprises:
- determining whether the platform on which the application is to be executed is a browser implementation or a non-browser implementation;
- in response to determining that the platform is a non-browser implementation, selecting the platform dependent tree of the one or more platform dependent trees corresponding to the platform; and
- in response to determining that the platform is a browser implementation:
  - determining a browser on which the application is to be executed,
  - selecting the platform dependent tree of the one or more platform dependent trees corresponding to the platform and the browser.

20. The non-transitory computer-readable medium of claim 19, wherein the operations further comprising loading vendor specific handling code based upon a vendor-of the browser.

* * * * *